United States Patent
Bai et al.

(10) Patent No.: US 10,318,159 B1
(45) Date of Patent: Jun. 11, 2019

(54) METHOD AND SYSTEM FOR PHYSICAL LOCALITY REPAIR IN A STORAGE SYSTEM

(71) Applicant: EMC IP Holding Company LLC, Hopkinton, MA (US)

(72) Inventors: Lan Bai, Chelsea, MI (US); Atul Karmarkar, San Jose, CA (US); Abhinav Duggal, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 59 days.

(21) Appl. No.: 15/622,450

(22) Filed: Jun. 14, 2017

(51) Int. Cl.
*G06F 3/00* (2006.01)
*G06F 3/06* (2006.01)
*G06F 12/0864* (2016.01)
*G06F 12/1045* (2016.01)

(52) U.S. Cl.
CPC .......... *G06F 3/0608* (2013.01); *G06F 3/065* (2013.01); *G06F 3/067* (2013.01); *G06F 3/0641* (2013.01); *G06F 12/0864* (2013.01); *G06F 12/1045* (2013.01); *G06F 2212/608* (2013.01); *G06F 2212/6032* (2013.04)

(58) Field of Classification Search
CPC .. G06F 3/0608; G06F 12/1045; G06F 3/0641; G06F 3/065; G06F 12/0864; G06F 3/067; G06F 2212/608; G06F 2212/6032
See application file for complete search history.

(56) References Cited

U.S. PATENT DOCUMENTS

| | | | |
|---|---|---|---|
| 7,065,619 B1 | 6/2006 | Zhu et al. | |
| 7,913,114 B2 * | 3/2011 | Leppard | G06F 11/2094 714/15 |
| 8,447,740 B1 * | 5/2013 | Huang | G06F 17/30156 707/692 |
| 8,818,966 B1 * | 8/2014 | Nanda | G06F 17/30135 707/661 |
| 9,195,672 B1 * | 11/2015 | Pang | G06F 17/30371 |
| 9,483,494 B1 * | 11/2016 | Pang | G06F 11/1453 |
| 2009/0049238 A1 * | 2/2009 | Zhang | G06F 3/061 711/113 |
| 2009/0234892 A1 * | 9/2009 | Anglin | G06F 11/1453 |
| 2013/0046944 A1 * | 2/2013 | Domyo | G06F 11/1453 711/162 |
| 2013/0275696 A1 * | 10/2013 | Hayasaka | G06F 3/0608 711/162 |
| 2018/0032395 A1 * | 2/2018 | Yang | G06F 11/1068 |

\* cited by examiner

*Primary Examiner* — Francisco A Grullon
(74) *Attorney, Agent, or Firm* — Chamberlain, Hrdlicka, White, Williams & Aughtry

(57) ABSTRACT

In general, in one aspect, the invention relates to a method for managing persistent storage in a storage system. The method includes determining, using a first plurality of containers in the storage system, a locality threshold, and performing, using the locality threshold, a locality repair on a first container of a second plurality of containers in the storage system, wherein the second plurality of containers comprises the first plurality of container.

16 Claims, 6 Drawing Sheets

METHOD AND SYSTEM FOR PHYSICAL LOCALITY REPAIR IN A STORAGE SYSTEM

BACKGROUND

Computing devices generate, use, and store data. The data may be, for example, images, document, webpages, or meta-data associated with any of the files. The data may be stored in persistent storage.

DETAILED DESCRIPTION

Figure 1A:
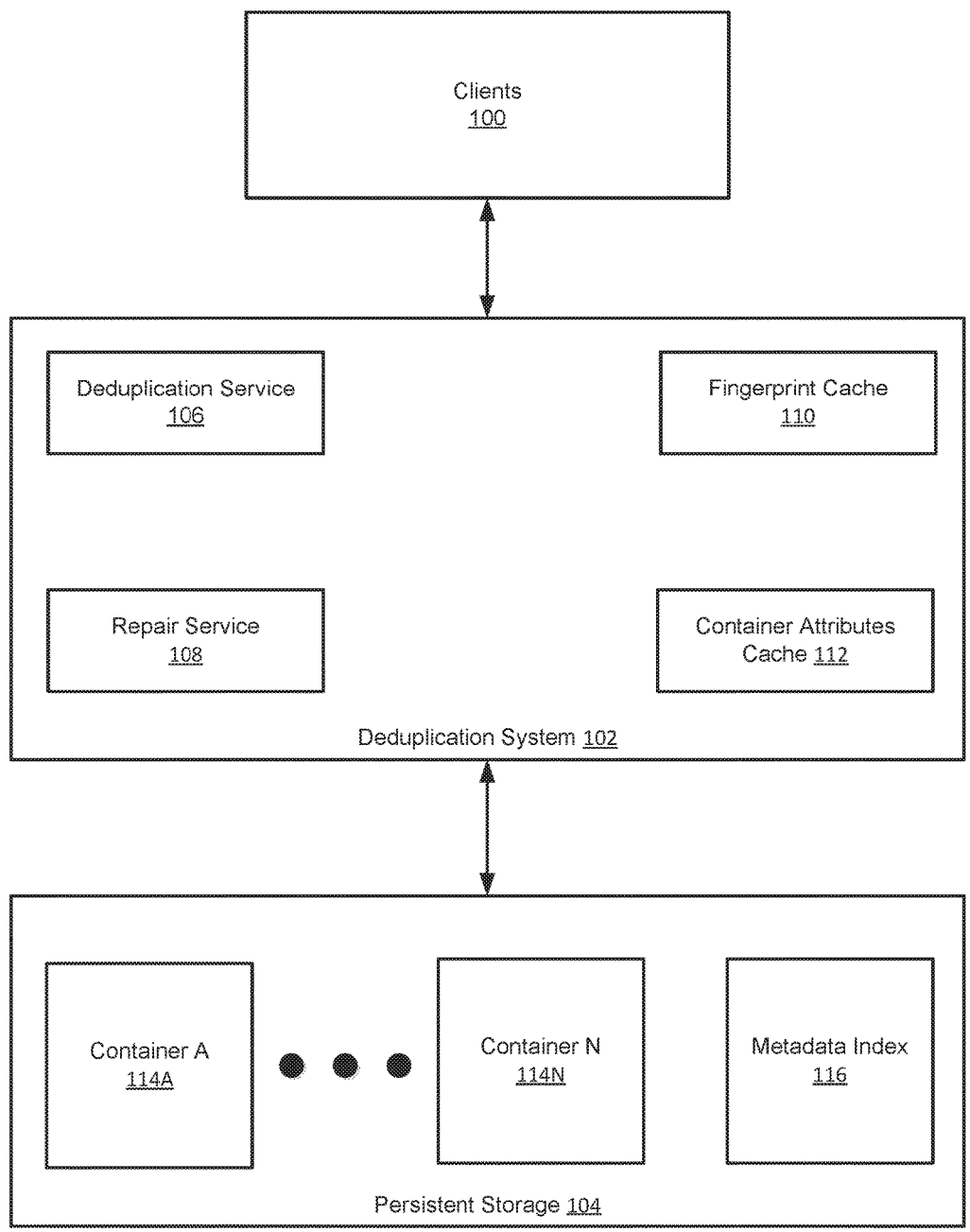
FIG. 1A shows a diagram of a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to methods and systems for performing locality repair in storage system. More specifically, embodiments of the invention relate to a two-phase process for performing locality repair. In the first phase (also referred to as the "estimate phase"), a locality threshold is determined by sampling content stored in various containers in the persistent storage. In the second phase (also referred to as the "repair phase"), the locality threshold is used to identify portions of the stored content to repair and then repairing the stored content. In one embodiment of the invention, as used herein "repairing" of content refers to decreasing the locality value of a particular segment (e.g., a metadata segment, described below). Additional details about embodiments of the two-phase process are provided below, e.g., in FIGS. 3A-4.

In one embodiment of the invention, the methods and systems may provide functionality for deduplicating data before storing the data in the persistent storage. Deduplicating the data, before storing the data in the persistent storage, may increase the amount of data that can be stored in the persistent storage when compared to the amount of data that can be stored in the persistent storage without deduplicating the data. Deduplicating the data may also decrease the cost associated with storing data in the persistent storage by reducing the total amount of storage required to store the deduplicated data when compared to the amount of storage required to store the data without being deduplicated.

As used herein, deduplication refers to methods of storing only portions of data that are not already stored in the persistent storage. For example, when multiple versions of a large text document, having only minimal differences between each of the versions, are stored without deduplication, storing each version will require approximately the same amount of storage space of a persistent storage. In contrast, when the multiple versions of the large text document are stored with deduplication, only the first version of the multiple versions stored will require a substantial amount of storage. Once the first version is stored in persistent storage, the versions of the large word document subsequently stored will be deduplicated before being stored in the persistent storage resulting in much less storage space of the persistent storage being required to store the subsequently stored versions when compared to the amount of storage space of the persistent storage required to store the first stored version. In one or more embodiments of the invention, additional detail about deduplication is provided below, e.g., in FIGS. 1A-2C.

FIG. 1A shows a diagram of a system in accordance with one or more embodiments of the invention. As shown in FIG. 1A, the system includes one or more clients (100), a deduplication system (102), and persistent storage (104). Each of these components is described below.

In one or more embodiments of the invention, a client (100) is any system or process executing on a system that includes functionality to issue a request to write data to the deduplication system (102) and/or issue a read request to the deduplication system (102). In one or more embodiments of the invention, the clients (100) may each include a processor(s) (not shown), memory (not shown), and persistent storage (not shown). The clients may include other components without departing from the invention.

In one or more embodiments of the invention, a client (100) is operatively connected to the deduplication system (102) using any combination of wireless and/or wired connections and any communication protocol(s).

In one or more embodiments of the invention, the distribution system (102) includes a processor(s) (not shown), memory (not shown), and persistent storage (not shown). The distribution system may include other components without departing from the invention. The distribution system includes a deduplication service (106), a repair service (108), a fingerprint cache (110), and a container attributes cache (112). Each of these components is described below.

The deduplication service (106) includes functionality to deduplicate data prior to the data being written to the persistent storage. In one embodiment of the invention, the deduplication service writes data to the persistent storage in the manner described below in FIGS. 1A-2C.

The repair service (108) includes functionality to perform locality repair on the content stored in the persistent storage. In one embodiment of the invention, the locality repair is performed in accordance with the method shown in FIGS. 3A-4.

The fingerprint cache (110) includes a set of entries, where each entry in the fingerprint cache includes a mapping between a fingerprint (i.e., a fingerprint for segment (described below)) and a container identifier (ID) (i.e., the container ID of the container in which the segment associated with the fingerprint is stored). The fingerprint of segment may be a bit sequence that identifies the segment. The fingerprint may be generated using Rabin's fingerprinting algorithm, a cryptographic hash function, or any other fingerprinting algorithm without departing from the invention. The cryptographic hash function may be, e.g., a message digest (MD) algorithm or a secure hash algorithm (SHA). The message MD algorithm may be, e.g., MD5. The SHA may be, e.g., SHA-0, SHA-1, SHA-2, or SHA3. Other fingerprinting algorithms may be used without departing from the invention.

Continuing with the discussion of FIG. 1A, the fingerprint cache (110) may be updated by the deduplication service (106) as described below. Further, the fingerprint cache may be used by the repair service as described in FIGS. 3A-4.

In one embodiment of the invention, the container attributes cache (112) includes attribute information about the type of segments stored in each container. For example, the container attribute cache may include a set of entries, where each entry includes a container identifier (ID) and the type(s) of segments stored in the container (i.e., the container identified by the container ID). The container attribute cache may be updated by the deduplication service and the repair service (described below). Further, the container attribute cache may be used by the repair service as described in FIGS. 3A-4.

In one or more embodiments of the invention, persistent storage may include, but is not limited to, optical storage, magnetic storage, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM).

In one embodiment of the invention, the persistent storage includes a metadata index (116) and one or more containers (112A, 114N). The metadata index (116) includes a set of entries, where each entry in the metadata index includes a mapping between a fingerprint (i.e., a fingerprint for segment) and a container identifier (ID) (i.e., the container ID of the container in which the segment associated with the fingerprint is stored). The metadata index typically stores all of the fingerprint to container ID mappings for all containers in the persistent storage while the fingerprint cache typically stores only a subset of the aforementioned entries (e.g., the most recently used entries). The metadata index may store additional information without departing from the invention.

In one embodiment of the invention, data from the clients is stored in the persistent storage using a combination of data segments (also referred to as L0 segments) and metadata segments (also referred to as LP segments). The data segments are generated by dividing the data received from the client into smaller units. For example, if the client transmitted an 8 Mb file to store in the persistent storage, the deduplication service may first divide the 8 Mb file into 1024 data segments, each with 8 Kb of data. The deduplication service may then generate a fingerprint for each of the generated data segments. These fingerprints are subsequently stored in the persistent storage in one or more metadata segments. For example, if each metadata segment can only store 512 fingerprints, then two metadata segments (each with 512 fingerprints) are created by the deduplication service. The metadata segments that include fingerprints of the data segments may be referred to as L1 metadata segments and/or first-level metadata segments.

Depending on the implementation of the deduplication service, the deduplication service may generate additional higher-level metadata segments. Continuing with the above example, the deduplication service may generate an L2 segment that includes fingerprints of one or more L1 metadata segments. The number of levels of metadata segments may vary based on the implementation of the deduplication service. The metadata segments may be collectively referred to as LP segments.

The data segments and metadata segments generated by the deduplication service are stored in containers in the persistent storage. Each container may only store data segments or metadata segments. For example, a first container in the persistent storage may only include data segments. However, the data segments may by be associated with different files (i.e., different files that the client has sent to the deduplication system for storage). With respect to containers storing metadata segments, a container that stores metadata segments may include different types of metadata segments (e.g., L1 metadata segment, L2 segments, etc.).

An example of how files are stored in the persistent storage is provided below with respect to FIGS. 2A-C.

Figure 1B:
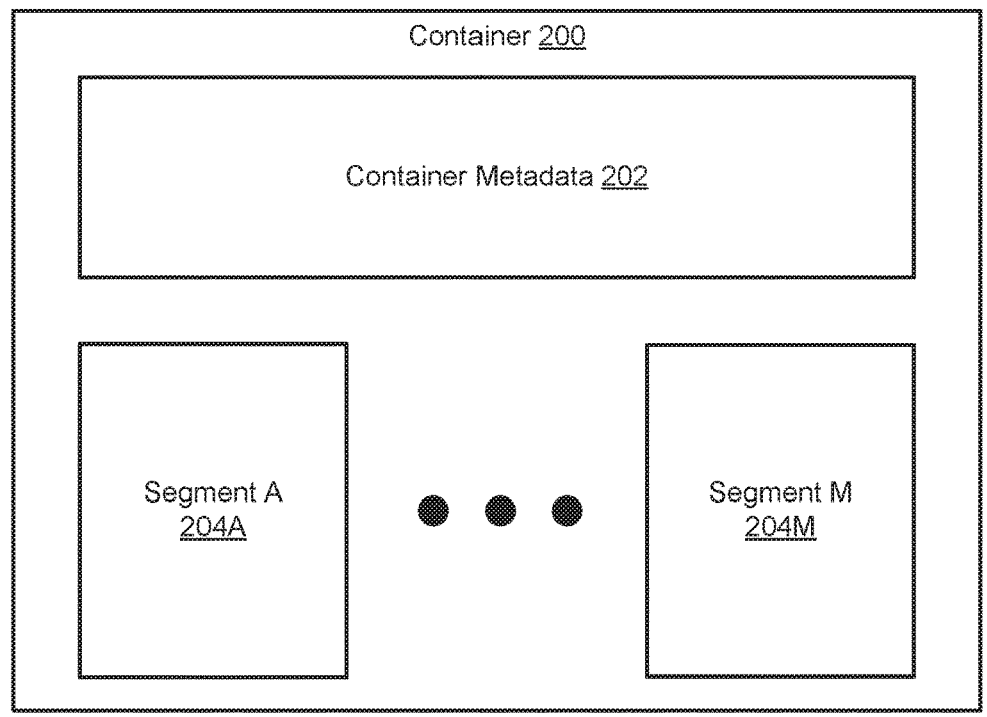
FIG. 1B shows a diagram of a container in accordance with one or more embodiments of the invention.

FIG. 1B shows a diagram of a container in accordance with one or more embodiments of the invention. As shown in FIG. 1B, each container (200) includes container metadata (202) and one or more segments (204A, 204M). Depending on the types of segments stored in the container, the segments may be data segments or metadata segments. The persistent storage may include any number of containers. The specific number of containers depends on the size of each container and the size of the persistent storage. Additional detail about the container metadata (202) is provided in FIG. 1C. Further, the size of the segments (204A, 204M) stored in the containers may vary based on the implementation of the invention.

Figure 1C:
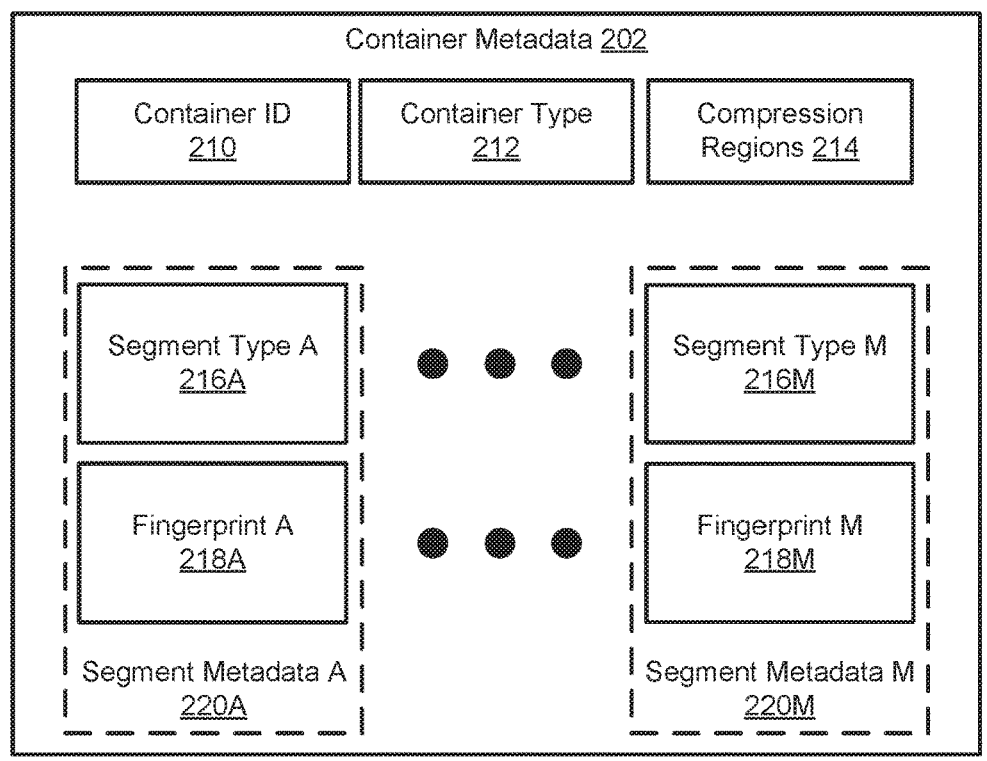
FIG. 1C shows a diagram of container metadata in accordance with one or more embodiments of the invention.

FIG. 1C shows a diagram of container metadata in accordance with one or more embodiments of the invention. The container metadata (202) may include one or more of the following: (i) a container identifier (ID) (210), which uniquely identifies the container in the persistent storage; (ii) container type (212), which specifies the types of segments the container includes, e.g., data segments or L1 and/or L2 and/or L3 etc. metadata segments; (iii) compression regions (214), which specifies which segments in the container are compressed; and (iv) segment metadata (220A, 220M), which includes a fingerprint (218A, 218M) (i.e., the fingerprint for the segment) and a segment type (216A, 216M) for each segment in the container. The segment type may specify whether the segment is a data segment (e.g., L0) or a metadata segment (e.g., LP). Further, the segment type may specify the specific metadata level (e.g., L1, L2, etc.).

Those skilled in the art will appreciate that the container metadata is not limited to the container metadata shown in FIG. 1C; rather, the container metadata may include additional and/or different information without departing from the invention.

Further, though not shown in FIG. 1C, the container metadata may include workload type. The workload type may specify the type of workload or process that generated the segments in the container. Examples of workload type include: (i) regular backup and (ii) incremental backup (e.g., incremental backup that uses a virtual synthetic technique or that uses a changed block tracking technique). The workload information may be used to prioritize which segments are repaired (see e.g., FIG. 4).

Figure 2A:
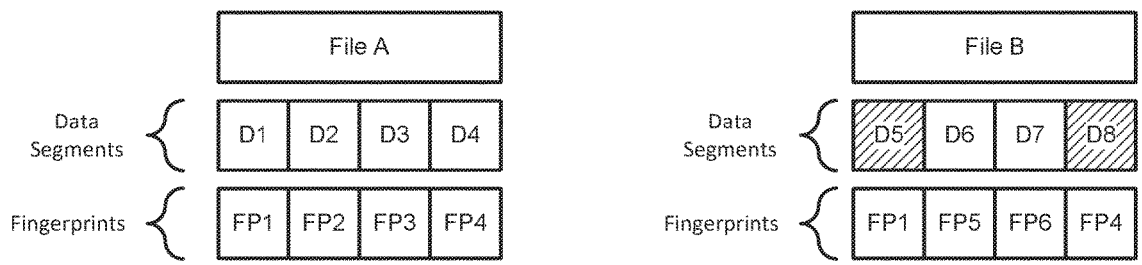
FIGS. 2A-2C show an example in accordance with one or more embodiments of the invention.
Figure 2B:
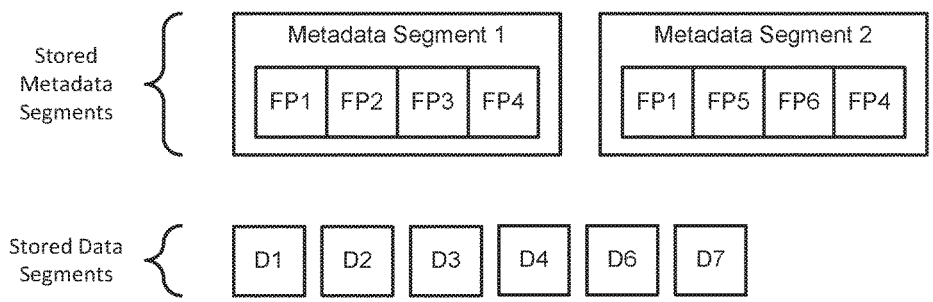
Figure 2C:
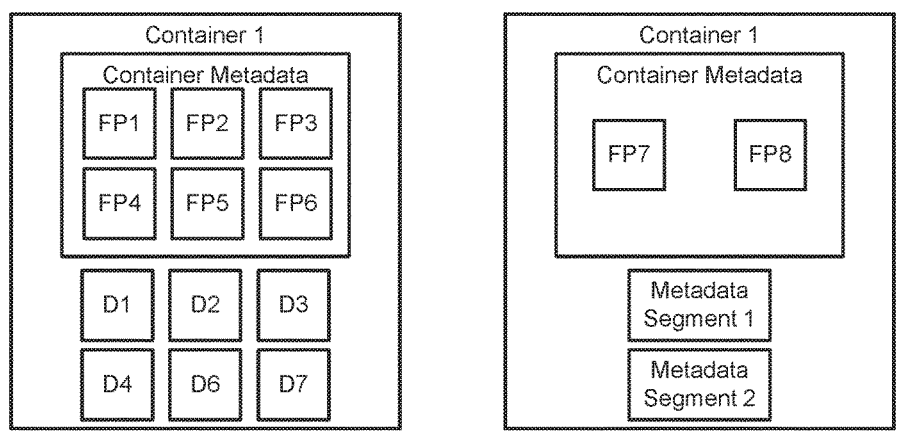

FIGS. 2A-C show a non-limiting of example of how files may be stored in the persistent storage by the deduplication in accordance with one or more embodiments of the invention. Referring to FIGS. 2A-2C, consider a scenario in which two files—File A and File B—are to be stored in the persistent storage (FIG. 1A, 104). The files are obtained from one or more clients (FIG. 1A, 100) by the deduplication system (FIG. 1A, 102) and then processed by the deduplication service (106) for storage in the persistent storage (FIG. 1A, 104).

As part of this processing, the deduplication service segments File A into data segments D1-D4 and calculates a fingerprint for each of the data segments (FP1-FP4). In this example, the deduplication service determines, using the fingerprints (FP1-FP4), that there are no duplicates of the data segments D1-D4 in the persistent storage. Based on this determination, data segments D1-D4 are stored in container 1 along with the corresponding fingerprints (FP1-FP4) (see FIG. 2C). In addition, a metadata segment, Metadata Segment 1, is generated by the deduplication service, where Metadata Segment 1 includes the fingerprints (FP1-FP4) for data segments (D1-D4) associated with File A. Metadata Segment 1 is subsequently stored in container 2 along with a fingerprint (FP7) for Metadata Segment 1.

File B is subsequently received by the deduplication service. The deduplication service segments File B into data segments D5-D8 and calculates a fingerprint for each of the data segments (FP1, FP5, FP6, FP4). Using the aforementioned fingerprints and the fingerprints already calculated for data segments (D1-D4) associated with File A, a determination is made that D5 and D8 are duplicates of D1 and D4, respectively. Based on this determination, only D6 and D7 are stored in container 1 along with their corresponding fingerprints (FP5 FP6).

A metadata segment, Metadata Segment 2, is then generated by the deduplication service, where Metadata Segment 2 includes the fingerprints (FP1, FP5, FP6, FP4) for data segments (D5-D8) associated with File B. Metadata Segment 2 is subsequently stored in container 2 along with a fingerprint (FP8) for Metadata Segment 2.

Figure 3A:
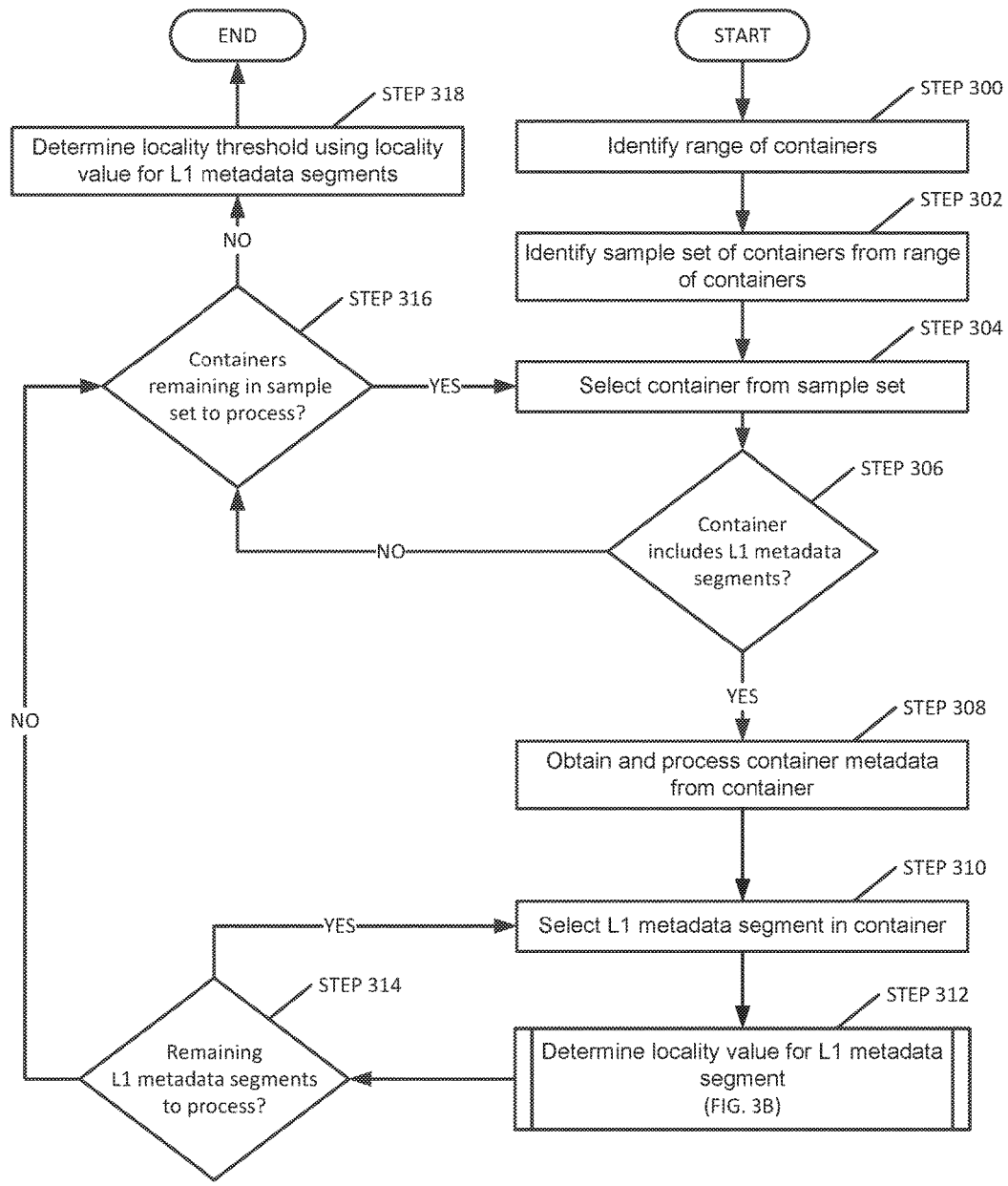
FIGS. 3A-3B show a flowchart of a method for determining a locality threshold in accordance with one or more embodiments of the invention.
Figure 3B:
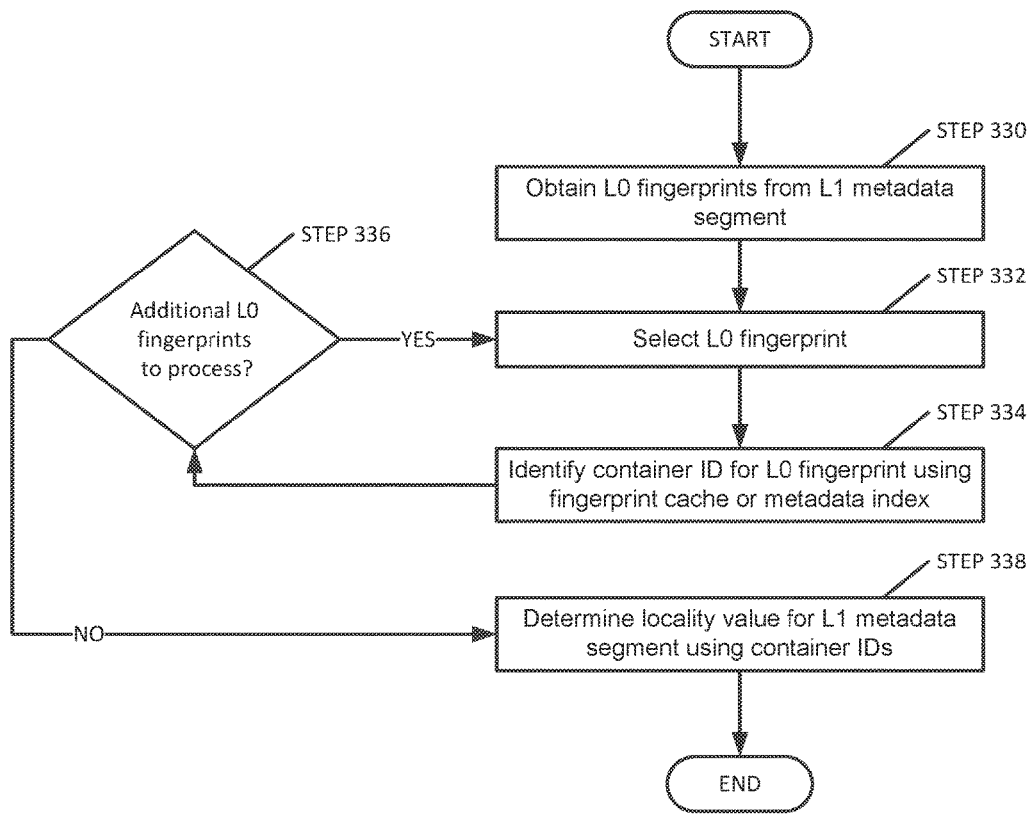
Figure 4:
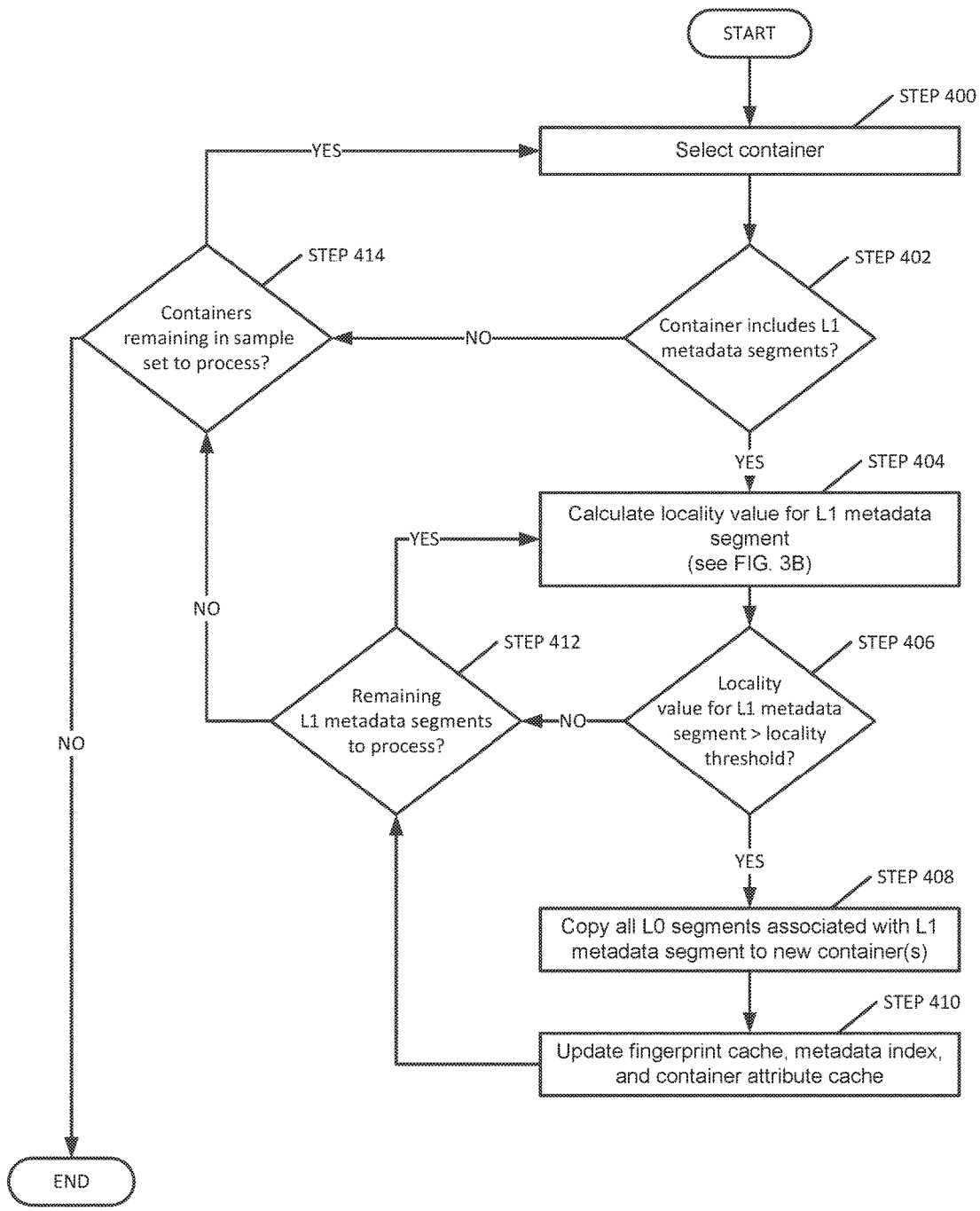
FIG. 4 shows a flowchart of a method of performing locality repair in accordance with one or more embodiments of the invention.

FIGS. 3A-4 show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. Further, the method shown in FIGS. 3A-3B may be performed prior to the method shown in FIG. 4 being performed.

FIGS. 3A-3B show a flowchart of a method for determining a locality threshold in accordance with one or more embodiments of the invention. More specifically, FIGS. 3A-3B show a method that is performed during the estimate phase in accordance with one or more embodiments of the invention. The method shown in FIGS. 3A-3B may be performed by the repair service (FIG. 1A, 108).

Turning to FIG. 3A, in step 300, a range of containers to process as part of the estimate phase is identified. The containers identified in step 300 may correspond to containers that have been written to persistent storage since the last time the estimate phase was performed. The information used to identify the range of containers may be obtained from the container attribute cache (FIG. 1A, 112), where the container attribute cache is updated each time a new container is written to the persistent storage. Those skilled in the art will appreciate the container attribute cache may be updated more or less frequently and/or based on different events without departing from the invention. Further, other methods for identifying the range of containers may be used without departing from the invention.

In step 302, a sample set of containers is selected from the range of containers identified in step 300. The size of the sample set of containers may vary based on the implementation. In certain embodiments of the invention, the size of the sample set may be substantially smaller that the number of containers identified in step 300. For example, the sample set may include less than 10% of the total number of containers identified in step 300. Further, the selection of containers to include the sample set of container may be performed using any known method, based on random selection, and/or any other known or later discovered method.

In step 304, a container is selected from the sample set.

In step 306, a determination is made about whether the selected container includes L1 metadata segments (i.e., first-level metadata segments). This determination may be made using the container attributes cache. Specifically, the container ID of the selected container may be used to obtain container attributes from the container attribute cache. If the selected container includes L1 metadata segments, the method proceeds to step 308; otherwise, the method proceeds to step 316.

In step 308, the container metadata for selected container is obtained from persistent storage. The container metadata is then processed to identify L1 metadata segments (i.e., metadata segments that include fingerprints of L0 segments) (see e.g., FIG. 2C, Metadata Segment 1). The identified metadata segments are then obtained from the persistent storage. If the metadata segments are compressed, then in another embodiment of the invention, compression regions of the container that include L1 metadata segments are identified. This identified compressed data is then obtained from the persistent storage. Upon receipt of the compressed data, the repair service (or another process in the deduplication system) decompresses the compressed data to obtain the uncompressed L1 metadata segments.

In step 310, an L1 metadata segment obtained in step 308 is selected.

In step 312, a locality value for the L1 metadata segment is determined. The generation of the locality value for the L1 metadata segment is described with respect to FIG. 3B.

In step 314, a determination is made about whether there are any remaining L1 metadata segments in the selected container to process. If there are additional L1 metadata segments to process, the method proceeds to step 310; otherwise, the process proceeds to step 316.

In step 316, a determination is made about whether there are any remaining containers in the sample set to process. If there are no remaining containers to process, the method proceeds to step 318; otherwise, the method proceeds to step 304.

In step 318, the locality values for all of the L1 metadata segments processed in steps 310-312 are used to determine a locality value distribution. The locality value distribution is then used to determine a locality threshold. The locality threshold is subsequently used in the repair phase described in FIG. 4. In embodiment of the invention, a repair quota (i.e., an upper bound on the amount of segments to repair) is computed after Step 300. The repair quota constrains how much space in the persistent storage will be used for locality repair for a single execution. For example, the quota can be computed as a certain percentage of the number of L1 metadata segments within the working range of containers. In such embodiments, the locality threshold is computed by finding the minimum locality value, e.g., using a histogram of locality values, so that the desired percentage of L1 metadata segments can be repaired. This method allows for the determination a locality threshold such that a specified percentage of L1 metadata segments that have the worst locality can be potentially repaired.

Turning to FIG. 3B, FIG. 3B shows a method for calculating a locality value for a L1 metadata segment in accordance with or more embodiments of the invention.

In step 330, the L0 fingerprints from the L1 metadata segment (i.e., the L1 metadata segment selected in step 310) are obtained.

In step 332, a L0 fingerprint is selected from the set of L0 fingerprints obtained in step 330.

In step 334, the container ID in which the L0 segment corresponding to the L0 fingerprint is located is identified. The container ID may be identified using the fingerprint cache, where the L0 fingerprint is used to identify an entry in the fingerprint cache. If fingerprint cache includes an entry with the L0 fingerprint, then the container ID is obtained from the identified entry. However, if there is a cache miss (i.e., no entry with the L0 fingerprint is identified), then the repair service performs a look-up in the metadata index (FIG. 1A, 116) using the L0 fingerprint in order to obtain the container ID.

In step 336, a determination is made about whether there are any other L0 fingerprints in the set of L0 fingerprints obtained in step 332 to process. If there are additional L0 fingerprints to process, the method proceeds to step 332; otherwise, the method proceeds to step 338.

In step 338, the locality value of the L1 metadata segment is determined using the number of unique container IDs identified during the processing of the L0 fingerprints stored in the L1 metadata segment. For example, consider a scenario in which the L1 metadata segment includes five L0 fingerprints and, based on the processing in steps 332-336, the following container IDs are identified: [C_ID1, C_ID1, C_ID3, C_ID2, C_ID1]. In this example, there are three unique container IDs identified and, as such, the locality value for the L1 metadata segment is three. Further, consider a second scenario in which the L1 metadata segment includes five L0 fingerprints and, based on the processing in steps 332-336, the following container IDs are identified: [C_ID1, C_ID1, C_ID1, C_ID1, C_ID1]. In this example, there is one unique container ID identified and, as such, the locality value for the L1 metadata segment is one. The aforementioned examples are not intended to limit the scope of the invention. Further, other methods for calculating the locality value from L1 metadata segments may be used without departing from the invention. For example, the locality value may be calculated based on the combination of container ID and compression region ID.

FIG. 4 shows a flowchart of a method of performing locality repair in accordance with one or more embodiments of the invention. More specifically, FIG. 4 shows a method that is performed during the repair phase in accordance with one or more embodiments of the invention. The method shown in FIG. 4 may be performed by the repair service (FIG. 1A, 108).

In step 400, a container is selected. The selected container may correspond any container in the persistent storage and/or any container in the range of containers (i.e., the range of containers identified in step 300).

In step 402, a determination is made about whether the selected container includes L1 metadata segments (i.e., first-level metadata segments). This determination may be made using the container attributes cache. Specifically, the container ID of the selected container may be used to obtain container attributes from the container attribute cache. If the selected container includes L1 metadata segments, the method proceeds to step 404; otherwise, the method proceeds to step 414.

In step 404, a locality value for an L1 metadata segment is calculated. The locality value may be calculated as described with respect to FIG. 3B. In one embodiment of the invention, the locality value for the L1 metadata segment may have been previously calculated as part of the estimate phase (see e.g., FIGS. 3A-3B). In such cases, the locality value for L1 metadata segment may be recalculated or, alternatively, the previously calculated locality value for the L1 metadata segment may be used.

In step 406, a determination is made about whether the calculated locality value for the L1 metadata segment is greater (or equal to) the locality threshold. If the calculated locality value for the L1 metadata segment is greater (or equal to) the locality threshold, then the process proceeds to step 408; otherwise, the process proceeds to step 412.

In step 408, a copy of all L0 segments referenced by the L1 metadata segment (i.e., all L0 segments for which the L1 metadata segment includes a fingerprint) are stored in a new container(s). Those skilled in the art will appreciate that copying all of the L0 segments referenced by the L1 metadata segment may result in the L1 metadata segment having a locality value of one (assuming that all L0 segments referenced by the L1 metadata segment can be stored in a single container).

In step 410, the fingerprint cache and the metadata cache are updated to reflect that L0 segments referenced by the L1 metadata segment are now in a new container. Further, the container attributes cache is updated to include an entry from the newly stored container.

In step 412, a determination is made about whether there are any remaining L1 metadata segments in the selected container to process. If there are additional L1 metadata segments to process, the method proceeds to step 404; otherwise, the process proceeds to step 414.

In step 414, a determination is made about whether there are any remaining containers to process. If there are no remaining containers to process, the method ends; otherwise, the method proceeds to step 400.

In one embodiment of the invention, instead of repairing the L1 metadata segments identified in step 406 as they are encountered, the repair of the identified L1 metadata segments may be performed by prioritizing the repair L1 metadata segments based on workload type. For example, L1 metadata segments associated with incremental backup may be prioritized over L1 metadata segments that are associated with regular backup. Other methods for prioritizing the order in which the identified L1 metadata segments are repaired may be implemented without departing from the invention. For example, in one embodiment of the invention, the estimate phase (FIGS. 3A-3B) and the repair phase (FIG. 4) may be performed on L1 metadata segments with higher priority (as described above) within the range of containers. If, after this has been completed (and there is repair quota remaining), then the estimate phase (FIGS.

3A-3B) and the repair phase (FIG. 4) may be performed on L1 metadata segments that have lower priority in the same range of containers.

While the embodiments of the invention has been described with respect to repairing locality of L1 metadata segments, embodiments of the invention may be extended to repairing L2 (or higher-level) metadata segments. For example, embodiments of the invention may be used to repair $L_N$ metadata segments by processing $L_{N-1}$ metadata segments (where N≥1), in the same manner as described above with respect to L1 metadata segments.

In embodiment of the invention, the amount of deduplication system resources dedicated to the repair process may be set relative to the percentage of new data written to the persistent storage. In this manner, the resource dedicated to the two-phase repair process may not impact (or not materially impact) the writing of new data to the persistent storage.

Embodiments of the invention may have one or more of the following advantages. Embodiments of the two-phase repair method described above may be less sensitive to metadata locality, as the repair method does not require enumeration of the segment tree of files that are stored in the persistent storage. Further, embodiments of the two-phase repair method described above may process less data relative to other known repair methods thereby improving the repair efficiency.

Depending on the manner in which the invention is implemented, the segments processed in accordance with embodiments of the two-phase repair method described above are more likely to be segments that have bad locality due to recent modification and more likely to benefit from better locality because they belong to more recent backups.

The direct processing of the metadata segments in the embodiment described above (see e.g., FIGS. 3A-4) is typically more efficient than processing the metadata segments using logical enumeration, because the segment references (i.e., the fingerprints) are accessed in the order of their physical location within the container.

One or more embodiments of the invention may be implemented using instructions executed by one or more processors in the deduplication system. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing persistent storage in a storage system, the method comprising:
   determining, using a first plurality of containers in the storage system, a locality threshold;
   performing, using the locality threshold, a locality repair on a first container of a second plurality of containers in the storage system, wherein the second plurality of containers comprises the first plurality of containers;
   wherein determining the locality threshold comprises:
      identifying the first plurality of containers from the second plurality of containers, wherein a cardinality of the first plurality of containers is less than a cardinality of the second plurality of containers;
      determining a locality value for each metadata segment identified in each of the first plurality of containers to obtain a set of locality values, wherein the locality value for each metadata segment corresponds to a number of unique containers in which segments referenced by the metadata segment are located; and
      determining the locality threshold using the set of locality values.

2. The method of claim 1,
   wherein performing the locality repair comprises copying all segments referenced by a first segment in the first container to a new container in the storage system, and
   wherein the locality value of the first segment is greater than the locality threshold.

3. The method of claim 2, wherein the first segment is a metadata segment.

4. The method of claim 2, wherein the segments are referenced by the first segment using fingerprints of the segments, wherein the fingerprints are stored in the first segment.

5. The method of claim 1, wherein the first container is not one of the first plurality of containers.

6. The method of claim 1, wherein determining the locality value of each metadata segment comprises using a fingerprint cache, wherein the fingerprint cache maps fingerprints to container identifiers.

7. The method of claim 1, wherein identifying the first plurality of containers comprises using a container attributes cache.

8. The method of claim 1, wherein each metadata segment is a first-level metadata segment.

9. A non-transitory computer readable medium comprising computer readable program code, which when executed by a computer processor enables the computer processor to perform a method for managing persistent storage, the method comprising:
   determining, using a first plurality of containers in the storage system, a locality threshold; and
   performing, using the locality threshold, a locality repair on a first container of a second plurality of containers in the storage system, wherein the second plurality of containers comprises the first plurality of containers;
   wherein determining the locality threshold comprises:
      identifying the first plurality of containers from the second plurality of containers, wherein a cardinality of the first plurality of containers is less than a cardinality of the second plurality of containers;
      determining a locality value for each metadata segment identified in each of the first plurality of containers to obtain a set of locality values, wherein the locality value for each metadata segment corresponds to a number of unique containers in which segments referenced by the metadata segment are located; and
      determining the locality threshold using the set of locality values.

10. The non-transitory computer readable medium of claim 9,
   wherein performing the locality repair comprises copying all segments referenced by a first segment in the first container to a new container in the storage system, and
   wherein the locality value of the first segment is greater than the locality threshold.

11. The non-transitory computer readable medium of claim 10, wherein the first segment is a metadata segment.

12. The non-transitory computer readable medium of claim 10, wherein the segments are referenced by the first segment using fingerprints of the segments, wherein the fingerprints are stored in the first segment.

13. The non-transitory computer readable medium of claim 9, wherein the first plurality of containers does not comprise the first container.

14. The non-transitory computer readable medium of claim 1, wherein determining the locality value of each metadata segment comprises using a fingerprint cache, wherein the fingerprint cache maps fingerprints to container identifiers.

15. The non-transitory computer readable medium of claim 1, wherein identifying the first plurality of containers comprises using a container attributes cache.

16. The non-transitory computer readable medium of claim 1, wherein each metadata segment is a first-level metadata segment.

* * * * *